March 9, 1965 K. E. VOYLES 3,172,960

SYMMETRICAL TRANSISTOR AMPLIFIER

Filed Dec. 12, 1961

INVENTOR
K. E. VOYLES
BY John K. Mullarney
ATTORNEY

United States Patent Office 3,172,960

Patented Mar. 9, 1965

3,172,960
SYMMETRICAL TRANSISTOR AMPLIFIER

Kennard E. Voyles, Indianapolis, Ind., assignor to Bell Telephone Laboratories, Incorporated, New York, N.Y., a corporation of New York Filed Dec. 12, 1961, Ser. No. 158,759
7 Claims. (Cl. 179—81)

The invention relates to transistor amplifiers and more particularly to a transistor amplifier circuit which is capable of operating satisfactorily irrespective of the polarity of the power source connected thereto.

Transistors, comprised of the usual three elements, i.e., collector, emitter and base, are ordinarily connected in circuits which place a forward bias on the emitter-to-base junction of the transistor and a reverse bias on the collector-to-base junction. Alternating current applied between the base element of such a transistor and its emitter will cause amplified current to flow in the emitter and collector circuits thereby producing useful gain.

Ordinarily, transistor amplifiers will operate only when the proper polarity of direct current bias is applied to them. Accordingly, when telephone line voltage, for example, is used to power these amplifiers, and when, as is frequently the case, this voltage can appear at the telephone subset with either polarity, it heretofore has been necessary to insert a bridge rectifier or polarity guard between the amplifier and the telephone line to assure the proper polarity for the amplifier; see the patent to A. J. Chase, 2,785,231, issued March 12, 1957. In the absence of these expedients either the transistor itself will be damaged or, at the least, the circuit will not function as intended.

It is therefore an object of the invention to provide a transistor amplifier which will operate with either line polarity without benefit of a bridge rectifier or a polarity guard.

A more general object is to amplify alternating signals irrespective of the polarity of the power source connected to the amplifying circuit.

These and other objects of the invention are attained in accordance with the present invention wherein a symmetrical or bidirectional junction transistor has its nominal collector element connected to one terminal of a direct current bias supply and its nominal emitter connected to the other terminal. The primary winding of a first transformer is connected in the emitter lead of the transistor and the primary winding of a separate but identical transformer is connected in the collector lead, the secondaries of said transformers being connected in a series-aiding manner to a load. The signal to be amplified is fed into the base of the transistor through a blocking capacitor, and two equal resistors are respectively connected from the base to each supply terminal to establish the operating-point base bias current. The circuit so connected is completely symmetrical and will function to amplify satisfactorily the applied signal irrespective of the polarity of the direct current bias.

Figure 1:
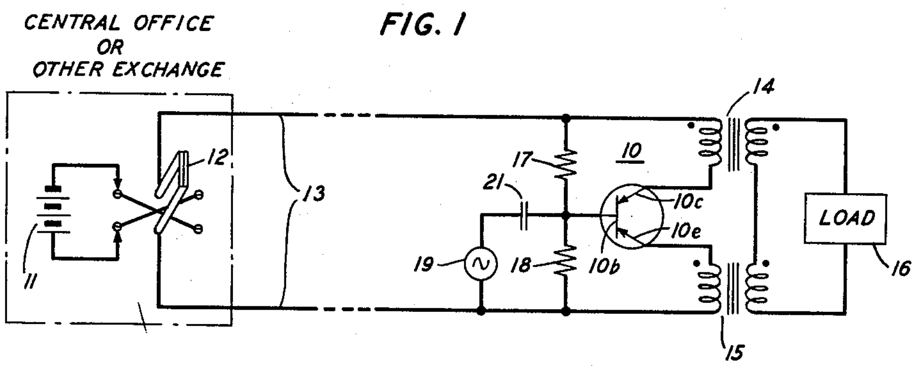
Figure 2:
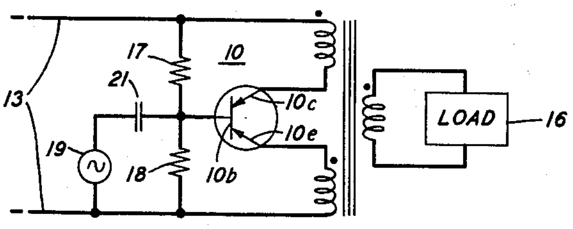
Figure 3:
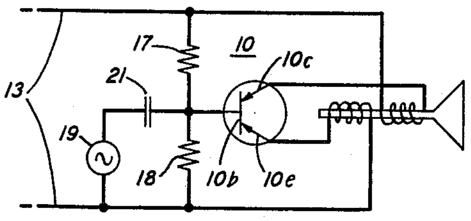

The advantages and features of the invention will become more apparent from the following detailed description taken in conjunction with the accompanying drawing, in which:

FIG. 1 is a schematic circuit diagram of an illustrative transmitter amplifier embodying the principles of the present invention; and FIGS. 2 and 3 are schematic circuit diagrams of further embodiments of the invention.

The circuit to be described is particularly adapted for use in telephone sets that require amplifiers for various purposes such as hard-of-hearing sets, weak speech sets, sets using the lower output operator's transmitters, and long loop sets. These amplifiers are generally powered by the telephone line voltage supplied from the central office. As is known to those in the art, this voltage can appear at the telephone set with either polarity and hence it has been the practice heretofore to insert a rectifier or polarity guard between the amplifier and the telephone line.

Referring now to FIG. 1 of the drawing, a bipolar direct current bias supply (e.g., a central office or other exchange) is indicated symbolically by the battery 11 and double pole, double throw switch 12. Depending upon the switch position, either battery terminal can be connected to either transmission bus 13. For the present, it will be assumed that the negative terminal of the bias battery is connected to the upper bus 13, with the positive terminal then connected to the lower bus.

In accordance with the invention, a symmetrical or bidirectional junction type transistor is utilized herein at the telephone set. These transistors are constructed in the same way as conventional junction transistors with the exception that the collector and emitter junctions are made substantially identical. Symmetrical transistors and their properties are described in the article entitled "Symmetrical Properties of Transistors and Their Applications," by George S. Sziklai, Proc. I.R.E., volume 41, June 1953, pages 717–724.

The terminal regions (i.e., the nominal collector and emitter) of the symmetrical transistor 10 are connected across the transmission buses 13. While a PNP type junction transistor has been illustrated in the drawing, it will be clear to those in the art that the invention is in no way limited thereto and a symmetrical NPN junction transistor can just as readily be utilized in carrying out the invention. The nominal collector element 10*c* is connected to the upper bus 13 via the primary winding of a first transformer 14, and the nominal emitter 10*e* is connected to the lower bus via the primary winding of a separate but identical (e.g., same number of primary and secondary turns) transformer 15. The secondaries of the transformers 14 and 15 are connected in series-aiding fashion and feed the load 16.

Two equal resistors 17 and 18 are respectively connected from the base 10*b* to each transmission bus to thereby establish the operating-point base bias current. The alternating current signal to be amplified is illustrated symbolically by the signal source 19. This signal is fed to the base or intermediate region of transistor 10 via the D.C. blocking capacitor 21. The signal source can be returned to either battery terminal since these are at the same potential from an A.C. standpoint. If the lines or buses 13 comprise a typical two wire telephone transmission line, the speech signal can be derived therefrom by conventional techniques known to those in the art; see the above-cited patent to Chase.

Referring to FIG. 1, it will be seen that when a PNP transistor is used and the bias polarity is negative on the upper bus, normal D.C. biasing conditions prevail and the transistor functions in a manner analogous to the conventional common emitter configuration (i.e., the instant configuration might be described as a common emitter with an additional load in the emitter path). For the assumed conditions, the nominal emitter-to-base junction is forward biased and the nominal collector-to-base junction is reverse biased. The current flow is in the same diretcion in each primary, and the magnitude of current flow in each is substantially the same (i.e., collector current=$\alpha$(emitter current); and $\alpha$=0.96 to 0.99).

If the bias battery polarity is now reversed, with positive voltage on the upper bus and negative on the lower, the nominal emitter and collector elements exchange functions.

That is, the nominal collector 10*c* will now function as an emitter, and the nominal emitter 10*e* as a collector. Here again, however, the transistor will amplify as it did with the original assumed battery polarity. Thus, since the transistor and circuit are symmetrical, amplification is realized as before, and the overall circuit gain is substantially the same irrespective of the polarity of the applied battery.

Since the magnitudes of the current flow in each of the primaries are substantially the same, the two transformers can utilize the same iron core (i.e., they can be combined) without detrimental results. Thus, a saving in space and material can thereby be realized. In this latter arrangement, the two secondaries can also be combined into a single continuous secondary winding. This modification is illustrated in FIG. 2 of the drawings.

Rather than constitute the primary windings of a pair of transformers, the windings connected in the emitter and collector leads can serve as voice coils for a loudspeaker or telephone receiver.

This arrangement is illustrated symbolically in FIG. 3. It should be clear to those in the art that the circuit will function in the described manner irrespective of the type transducer (e.g., transformer, loudspeaker, telephone receiver) fed thereby.

It is to be understood, therefore, that the foregoing disclosure relates to only a preferred embodiment of the invention, and that numerous modifications or alterations may be made therein without departing from the spirit and scope of the invention.

What is claimed is:

1. A transistor amplifier operable from a voltage source of reversible polarity comprising a symmetrical transistor having a nominal collector, a nominal emitter and a base, transducer means having first and second coil windings which are substantially identical, means connecting said first winding between one terminal of said source and the nominal collector of said transistor, means connecting said second winding between the other terminal of said source and the nominal emitter of said transistor, resistor means connecting the base of said transistor to each of the terminals of said source, and means for coupling the signal to be amplified to said base, whereby said circuit is operative to amplify the applied signal irrespective of the polarity of the voltage source.

2. A transistor amplifier operable from a voltage source of reversible polarity comprising a symmetrical transistor, means connecting the nominal collector of said transistor to one terminal of the voltage source, said means including the primary winding of a first transformer means, means connecting the nominal emitter of said transistor to the other terminal of the voltage source, the latter means including the primary winding of a second transformer means, the primary windings of said first and second transformer means being substantially identical, resistor means connecting the base of said transistor to each of the terminals of said source, and means for coupling the signal to be amplified to said base, whereby said circuit is operative to amplify the applied signal irrespective of the polarity of the voltage source.

3. A transistor amplifier as defined in claim 2 wherein the transformer means are each wound on the same metallic core.

4. A transistor amplifier operable from a voltage source of reversible polarity comprising a junction type transistor having substantially symmetrical properties, means coupling a first terminal region of said transistor to one terminal of the voltage source, said means including the primary winding of a first transformer, means coupling the other terminal region of said transistor to the other terminal of the voltage source, the latter means including the primary winding of a second transformer, said first and second transformers being substantially identical and having their secondaries connected in series to a load, resistor means connecting the intermediate region of said transistor to each of the terminals of said source, and means for coupling the signal to be amplified to said intermediate region, whereby amplification is achieved irrespective of the polarity of the voltage source.

5. In an amplifier circuit adapted to be powered by the telephone line voltage supplied from a central office, said line voltage being of reversible polarity, a symmetrical transistor having a nominal collector, a nominal emitter and a base, a first transformer having the primary thereof connected between a first side of the telephone transmission line and the nominal collector of said transistor, a second transformer having the primary thereof connected between the other side of said telephone transmission line and the nominal emitter of said transistor, said first and second transformers being substantially identical and having their secondaries connected in series-aiding fashion to a load, a pair of equal resistors respectively connected from the base of said transistor to one side of the transmission line, and means adapted to couple the audio signal to be amplified to the base of said transistor, whereby the audio signal will be substantially equally amplified irrespective of the polarity of said telephone line voltage.

6. A transistor amplifier operable from a voltage source of reversible polarity comprising a symmetrical transistor, means connecting the normal collector of said transistor to one terminal of the voltage source, said means including the primary winding of a first transformer, means connecting the nominal emitter of said transistor to the other terminal of the voltage source, the latter means including the primary winding of a separate transformer substantially identical to the first transformer, said transformers having their secondaries connected series-aiding to a load, resistor means connecting the base of said transistor to each of the terminals of said source, and means for coupling the signal to be amplified to said base, whereby said circuit is operative to amplify the applied signal irrespective of the polarity of the power source.

7. In a telephone system having a central office including a source of direct current of reversible polarity, substation circuits, and transmission lines from said central office for supplying direct current and speech signals to said substation circuits, a substation circuit connected to one of said transmission lines comprising a symmetrical transistor having a nominal collector, a nominal emitter and a base, transformer means having first and second coil windings which are substantially identical, means connecting said first winding between a first side of the transmission line and the nominal collector of said transistor, means connecting said second winding between the other side of said transmission line and the nominal emitter of said transistor, a pair of equal resistors respectively connected from the base of said transistor to one side of the transmission line, and means for coupling speech signals from said transmission line to the base of said transistor, whereby said speech signals will be substantially equally amplified irrespective of the polarity of the direct current on said transmission line.

References Cited in the file of this patent

UNITED STATES PATENTS

| | | |
|---|---|---|
| 2,691,073 | Lowman | Oct. 5, 1954 |
| 2,763,832 | Shockley | Sept. 18, 1956 |
| 2,785,231 | Chase | Mar. 12, 1957 |
| 2,810,081 | Elliott | Oct. 15, 1957 |
| 2,816,238 | Elliott | Dec. 10, 1957 |
| 2,924,727 | Manning | Feb. 9, 1960 |
| 2,976,431 | Richards | Mar. 21, 1961 |